US007662894B2

(12) United States Patent
Hamed et al.

(10) Patent No.: US 7,662,894 B2
(45) Date of Patent: Feb. 16, 2010

(54) POLYMER SUPPORTED METALLOCENE CATALYST COMPOSITION FOR POLYMERIZING OLEFINS

(75) Inventors: Orass Hamed, Riyadh (SA); Akhlaq Moman, Riyadh (SA); Atieh Abu-Raqabah, Riyadh (SA)

(73) Assignee: Saudi Bosic Industries Corporation, Riyadh (SA)

( * ) Notice: Subject to any disclaimer, the term of this patent is extended or adjusted under 35 U.S.C. 154(b) by 496 days.

(21) Appl. No.: 11/641,160

(22) Filed: Dec. 19, 2006

(65) Prior Publication Data

US 2008/0146755 A1 Jun. 19, 2008

(51) Int. Cl.
C08F 4/76 (2006.01)
C08F 4/64 (2006.01)
C08F 4/50 (2006.01)
C08F 4/52 (2006.01)
B01J 31/38 (2006.01)

(52) U.S. Cl. .................. 526/113; 526/116; 526/151; 526/148; 526/153; 526/142; 526/904; 502/113; 502/118; 502/125

(58) Field of Classification Search .................. 526/904, 526/116, 113, 154, 151, 153, 142; 502/113, 502/125, 118
See application file for complete search history.

(56) References Cited

U.S. PATENT DOCUMENTS

| 4,021,599 A | * | 5/1977 | Kochhar et al. ........... 526/124.9 |
| 4,382,124 A | | 5/1983 | Meitzner et al. |
| 4,414,369 A | | 11/1983 | Kuroda |
| 4,420,592 A | | 12/1983 | Kato |
| 4,522,982 A | | 6/1985 | Ewen |
| 4,530,914 A | | 7/1985 | Ewen |
| 4,701,432 A | | 10/1987 | Welborn, Jr. |
| 4,703,094 A | | 10/1987 | Raufast |
| 4,937,299 A | | 6/1990 | Ewen |
| 5,032,562 A | | 7/1991 | Lo |
| 5,070,055 A | | 12/1991 | Schramm |
| 5,118,648 A | * | 6/1992 | Furtek et al. ................. 502/116 |
| 5,124,418 A | | 6/1992 | Welborn, Jr. |
| 5,183,867 A | | 2/1993 | Welborn, Jr. |
| 5,525,678 A | | 6/1996 | Mink |
| 5,539,076 A | | 7/1996 | Nowlin |
| 5,614,456 A | * | 3/1997 | Mink et al. .................. 502/115 |
| 5,691,264 A | * | 11/1997 | Sacchetti et al. ............. 502/134 |
| 5,882,750 A | | 3/1999 | Mink |
| 6,288,182 B1 | * | 9/2001 | Hamed et al. ............. 526/124.3 |
| 6,403,520 B1 | * | 6/2002 | Hamed et al. ................ 502/113 |

(Continued)

FOREIGN PATENT DOCUMENTS

WO WO 02/26837 4/2002

(Continued)

Primary Examiner—David Wu
Assistant Examiner—Rip A. Lee
(74) Attorney, Agent, or Firm—Jim Wheelington; William J. Spatz (57) ABSTRACT

A catalyst composition for polymerizing olefins to polymers having bimodal molecular weight distribution comprises two transition metal-containing metallocene compounds, a magnesium compound, an alcohol, an aluminum containing co-catalyst and a polymeric support. The transition metal in one of the metallocene compounds is zirconium and the transition metal in the second metallocene compound is selected from the group consisting of titanium, vanadium and hafnium. Polyolefin polymers made using the catalyst composition have broad molecular weight distributions and are useful in film and blow molding applications.

20 Claims, 3 Drawing Sheets showing the HDPE Bimodal resin with superior spherical morphology

U.S. PATENT DOCUMENTS

| | | |
|---|---|---|
| 6,413,901 B1 | 7/2002 | Moman |
| 6,617,277 B2 * | 9/2003 | Hamed et al. ............... 502/104 |
| 6,784,263 B2 * | 8/2004 | Hamed et al. ............... 526/114 |
| 6,861,487 B2 * | 3/2005 | Hamed et al. ............... 526/160 |
| 6,887,818 B2 * | 5/2005 | Jens et al. ................... 502/113 |
| 7,001,862 B2 * | 2/2006 | Moman et al. .............. 502/103 |
| 7,084,216 B2 * | 8/2006 | Moman et al. .............. 526/116 |
| 7,094,726 B2 * | 8/2006 | Moman et al. .............. 502/152 |
| 7,199,071 B2 * | 4/2007 | Zheng et al. ................ 502/103 |
| 2002/0026013 A1 * | 2/2002 | Lundquist et al. ........... 525/245 |
| 2004/0209764 A1 | 10/2004 | Hamed et al. |

FOREIGN PATENT DOCUMENTS

| | | |
|---|---|---|
| WO | WO 02/51880 A1 * | 7/2002 |
| WO | WO 02/51880 A1 * | 7/2009 |

* cited by examiner

Fig. 1, GPC analysis showing bimodal MWD of HDPE resin produced by catalyst A

Fig. 2, GPC analysis showing bimodal MWD of HDPE resin produced by catalyst B Fig. 3, GPC analysis showing bimodal MWD of HDPE resin produced by catalyst C Fig. 4, GPC analysis showing bimodal MWD of HDPE resin produced by catalyst D Fig. 5, GPC analysis showing bimodal MWD of HDPE resin produced by catalyst F Fig. 6, showing the HDPE Bimodal resin with superior spherical morphology

POLYMER SUPPORTED METALLOCENE CATALYST COMPOSITION FOR POLYMERIZING OLEFINS

FIELD OF THE INVENTION

This invention relates to a novel polymer supported catalyst system for olefin polymerization, methods of producing such catalysts and methods of polymerizing alpha-olefins at high catalyst activities to form polymers having multimodal or broad molecular weight distribution with superior spherical morphology, good bulk densities and low levels of fines. More particularly, this invention relates to catalyst compositions comprised of at least two metallocene compounds containing transition metals, one of which contains zirconium. The inventive catalyst composition also contains a magnesium containing compound, an alcohol, optionally an aluminum compound and a polymeric support, which is preferably polyvinyl chloride.

BACKGROUND OF THE INVENTION

A bimodal or a multimodal molecular weight distribution in certain resins indicates that the resin is comprised of at least two polymers of different molecular weights, more specifically, polymers of relatively higher and lower molecular weights. U.S. Pat. No. 4,461,873 found that the physical blending of different polymers having high and low molecular weights can lead to the formation of gel. Resins with biomodal or multimodal molecular weight distribution can also be produced using the melt blending technique described by Cozewith et al in WO 86/03756. However, such methods are expensive, cumbersome and time consuming.

Kuroda et al in U.S. Pat. No. 4,414,369, Kato et al in U.S. Pat. No. 4,420,592 and Raufast in U.S. Pat. No. 4,703,094 describe processes employing two reactors operating in series at different hydrogen concentrations to produce resin containing both high and low molecular weight polymer. In comparison to the bimodal resin produced by the physical blending of high molecular weight (HMW) and low molecular weight (LMW) resin, blends produced in these tandem processes were found to have an improved film appearance.

It is also known to use a single reactor containing blends of catalysts with different propagation and termination rate constants for ethylene polymerization for the production of broad or multi-modal molecular weight distribution polymer. U.S. Pat. No. 4,530,914 describes the use of a homogeneous catalyst system consisting of two different metallocenes for the production of broad molecular weight distribution and/or multi-modal molecular weight distribution polyolefin. U.S. Pat. Nos. 4,937,299 and 4,522,982 also describes homogeneous catalyst systems containing two or more metallocenes to produce blends of polymers with different molecular weights.

U.S. Pat. Nos. 4,701,432; 5,070,055; 5,032,562; 5,183,867; 5,525,678; 5,539,076; 5,614,456 and 5,882,750 describe silica-supported catalyst systems containing different active centers. The catalyst systems described in these patents are complicated and expensive, requiring for example expensive and troublesome aluminoxanes in their preparation. Further, silica supports which are suitable for these catalysts are prepared using spray drying or re-crystallization processes and high calcination temperatures which are complicated and/or expensive. Furthermore, the use of silica as a support results in the support remaining largely in the product, which can affect the product properties, such as optical properties, and processing.

One of the objects of the present invention is to overcome the above described problems with the prior art catalyst systems for producing bimodal and multimodal resins.

SUMMARY OF THE INVENTION

The catalyst composition of the present invention contains at least one zirconium based metallocene compound, at least one titanium, vanadium or hafnium based metallocene compound, a magnesium compound, an alcohol, optionally an aluminum compound and a polymeric support material, which is preferably polyvinylchloride. The catalyst composition, when used in conjunction with an organoaluminum compound or a mixture of organoaluminum compounds, is effective for olefin polymerization. Preferred products of olefin polymerization with the catalyst composition are medium and high density polyethylene and copolymers of ethylene with alpha-olefins having 3 to 18 carbon atoms. The catalyst system of the invention has the ability to produce polymers with a varied range of molecular weight distributions, i.e., from medium molecular weight distribution to a broad molecular weight distribution and/or bimodal-multimodal molecular weight distribution of Mw/Mn ranging between 5 and 100.

DETAILED DESCRIPTION OF THE INVENTION

The solid catalyst component used in the present invention contains at least two metallocene compounds, a magnesium compound, an alcohol and a polymeric support material. The product attained is used for olefin polymerization.

At least two metallocene compounds are used in the catalyst in the present invention. One of the metallocenes must be a zirconium based metallocene and the second must contain a titanium, vanadium or a hafnium transition metal. The metallocenes used can be represented by the general formula $(Cp)_zMR_wX_y$, wherein Cp represents a unsubstituted or substituted cyclopentadienyl ring, M represents a Group IVB or VB transition metal, R represents a hydrocarbyl group, X represents a halogen atom, $1 \leq z \leq 3$, $0 \leq w \leq 3$ and $0 \leq y \leq 3$. The cyclopentadienyl ring may be unsubstituted or substituted with a hydrocarbyl radical R, such as a alkyl, alkenyl, or aryl group containing 1 to 20 carbon atoms, for example, methyl, ethyl, propyl, amyl, isoamyl, isobutyl, or phenyl. Preferred examples of the above mentioned metallocene compounds include the following; bis(cyclopentadienyl)titanium dimethyl, bis(cyclopentadienyl)zirconium dimethyl, bis(cyclopentadienyl)titanium methyl chloride, bis(cyclopentadienyl)titanium ethyl chloride, bis(cyclopentadienyl)titanium dichloride, bis(cyclopentadienyl)zirconium methyl chloride, bis(cyclopentadienyl)zirconium ethyl chloride and bis(cyclopentadienyl)zirconium dichloride. The zirconium based metallocene compound of the invention will have a high hydrogen response (high hydrogen chain transfer rate), and the second metallocene metal compound containing titanium, vanadium, hafnium will have a lower hydrogen response (lower hydrogen chain transfer rate).

The magnesium compounds preferred in the catalyst composition of the invention include Grignard compounds represented by the general formula $R^2MgX$, wherein $R^2$ is a hydrocarbon group, and preferably an alkyl group, of 1 to 20 carbon atoms and X is a halogen atom, preferably chlorine. Other preferred magnesium compounds are represented by the general formula $R^3R^4Mg$, wherein $R^3$ and $R^4$ are each a hydrocarbon group of 1 to 20 carbon atoms. Preferred magnesium compounds include dialkylmagnesium compounds such as diethylmagnesium, dipropylmagnesium, di-iso-proylmagnesium, di-n-butylmagnesium, di-iso-butylmagnesium butylethylmagnesium, dihexylmagnesium, dioctylmagnesium, alkyl magnesium chlorides such as ethylmagnesium chloride, butylmagnesium chloride, hexylmagnesium chloride and the like.

Alcohol compounds useful in the catalyst composition of the invention can be represented in the general formula ROH, in which R can represent an alkyl group, aryl group or cycloalkyl group having 1 to 20 carbon atoms. The alcohol compound is believed to be important for the anchoring of the metallocene precursors of the catalyst composition. Preferred alcohol compounds include methanol, ethanol, propanol and iso-propanol.

The aluminum compounds of the invention include aluminoxane compounds or modified aluminoxane compounds represented by the general formula for linear aluminoxane, wherein q represents a number satisfying $0 \leq q \leq 50$, and/or for a cyclic aluminoxane, wherein s represents a number satisfying $3 \leq s \leq 50$, wherein $R^7, R^8, R^9$ and $R^{10}$ are either the same or different linear, branched or cyclic alkyl group of 1 to 12 carbons, such as methyl, ethyl, propyl or isobutyl. A preferred aluminum compound is an activator for the zirconium sites, such as methylaluminoxane. Commercially produced methylaluminoxane which contains some trimethylaluminum is most preferred.

The polymer support particles used in the present invention have a generally spherical shape with a mean particle diameter of 5 to 1000 μm, preferably 10 to 600 μm, and more preferably 15 to 100 μm, a pore radius of 10 to 1000 Angstrom, a surface area of 0.5 to 50 $m^2$/g, and preferably 1.0 to 10 $m^2$/g, and a pore volume of at least 0.02 $cm^3$/g, and preferably at least 0.1 $cm^3$/g. Examples of the polymeric materials useful in the catalyst of the present invention include beads of polymers such as polyvinylchloride, polyvinylalcohol, ethylene-vinylalcohol copolymer, polyethylacrylate and polymethylmethacrylate. Among these polymeric materials, the vinylpolymers are preferred and polyvinylchloride is most preferred. The polymeric materials used in the present invention have surface active sites such as labile chlorine atoms and/or polyvinyl alcohol sites.

The use of a polymer support in this invention offers significant advantages over traditional olefin polymerization catalysts which use supports such as silica or magnesium chloride. In comparison to silica supported catalysts, the polymer supports of the present invention do not require high temperature and prolonged dehydration steps prior to their use in catalyst synthesis, thereby simplifying the synthesis process and reducing the overall cost of catalyst preparation. Further the polymeric supports used in the present invention are substantially cheaper than silica or magnesium chloride supports. In addition, the catalyst in the present invention uses significantly lower levels of catalyst precursors for catalyst preparation than silica or magnesium chloride supported catalysts. Also, the catalyst in the present invention is more active than conventional silica or magnesium supported Ziegler-Natta catalysts and some supported metallocene catalysts. In the preferred embodiments of this invention, a polyvinyl chloride support is used.

The synthesis of the solid catalyst component of invention involves introducing the polymeric material described above into a vessel and then adding a diluent. Suitable diluents include alkanes such as isopentane, and ethers such as diethylether and dibutylether. The polymeric material is then treated with a magnesium compound described above at a temperature in the range of about 20° C. to 90° C. The ratio of magnesium compound to the polymer support can be in the range of 0.1 mmol to 10 mmol per gram of polymer. Then 0.01 to 0.1 $cm^3$ of pure alcohol per gram of polymeric material is added and mixed for about 5 minutes at a temperature in the range of about 20° C. to 90° C. The solvent is then evaporated using a nitrogen purge at a temperature in the range of about 20 to 80° C. Then vacuum is applied to ensure a 100% dry solid mixture.

The magnesium treated polymeric support produced or described above is then treated with 0.01 to 0.1 g of a zirconium based metallocene compound, per gram of treated support, dissolved in toluene, or other solvent, by mixing at a temperature in the range of about 20° C. to 100° C. for at least 60 minutes. Bis(cyclopentadienyl)zirconium dichloride, bis(methylcyclopentadienyl)zirconiumdichloride and bis(n-butylcyclopentadienyl)zirconiumdichloride, bis(indenyl)zirconium dichloride with ethylene or dialkyl silicon bridge are the preferred metallocene compounds. This step is followed by purging the slurry with excess nitrogen at about 40-90° C. to evaporate the toluene out of the mixture, before the addition of the second metallocene precursor.

The second metallocene compound for this catalyst synthesis is a titanium, vanadium or hafnium based metallocene, which it is believed, tend to produce high molecular weigh polymers than the zirconium based metallocenes. In this step, biscyclopentadienyl titanium dichloride, cyclopentadienyl titanium trichloride, biscyclopentadienyl vanadium dichloride, cyclopentadienyl vanadium trichloride, biscyclopentadienyl hafnium dichloride and cyclopentadienyl hafnium trichloride are the most preferred metallocenes. In this step, 0.01 to 0.1 g of the titanium, vanadium or hafnium-based metallocene, per gram of magnesium treated support, is dissolved in toluene, or other solvent, and mixed with the catalyst mixture described above at a temperature of about 20° C. to 90° C. for at least 10 minutes.

The final solid catalyst component has a molar ratio of M:Zr of about 1:1 to about 20:1, and preferably about 3:1 to about 10:1, wherein M is titanium, vanadium or hafnium. The thus-formed catalyst component is activated with suitable activators, also known as co-catalysts, for olefin polymerization. The preferred compounds for activation of the solid catalyst component are organoaluminum compounds, preferably methyl aluminoxane and most preferably modified aluminoxanes. The activator is mixed with the catalyst at the required Al:Metal molar ratio then washed and dried. The catalyst composition thus prepared is effective for the product of bimodal molecular distribution polymers when used in conjunction with an aluminum co-catalyst.

The preferred co-catalyst is a mixture of an activator for the titanium, vanadium and/or hafnium sites and an activator for the zirconium site. Modified aliphatic soluble MAO is most preferred because it can activate both sites efficiently. One or more of the aluminum compounds which comprise these activators can optionally be included in the catalyst precursor, or can be added solely during the polymerization reaction. Activators suitable for activating the titanium, vanadium and/or hafnium sites may be represented by the general formula $R^5{}_n AlX_{3-n}$, wherein $R^5$ represents a hydrocarbon group having 1 to 10 carbon atoms, X represents a halogen atom or an alkoxy group and n is 1, 2 or 3. Illustrative but not limiting examples include trialkylaluminums such as trimethylaluminum (TMA); triethylaluminum (TEAL); triisobutylaluminum (TIBA); tri-n-hexylaluminum (TnHAL); dialkylaluminum chlorides, such as dimethylaluminum chloride and diethylaluminum chloride; alkylaluminum dichlorides, such as methylaluminum dichloride and ethylaluminum dichloride; dialkylaluminum methoxides, such as dimethylaluminum methoxide and diethylaluminum ethoxide. The preferred activators for the titanium, vanadium, and/or hafnium sites are trimethylaluminum, triethylaluminum, triisobutylaluminum and tri-n-hexylaluminum.

The preferred zirconium sites activator is an aluminoxane represented by the general formula in the case of the linear aluminoxane, where q represents a number satisfying $0 \leq q \leq 50$, and/or for a cyclic aluminoxane, wherein s represents a number satisfying $3 \leq s \leq 50$. $R^6$, $R^7$, $R^8$ and $R^9$ are either the same or different linear, branched or cyclic alkyl group of 1 to 12 carbons, such as methyl, ethyl, propyl or isobutyl. The most preferred activator for the zirconium sites is methylaluminoxane. Since commercially produced methylaluminoxane contains trimethylaluminum, it can be conveniently used to activate both metallocene compounds of the invention.

The aluminum compound co-catalysts of the invention are preferably used in the range of about 1 to 1500 moles of aluminum per mole of the total transition metals, Zr and Ti, V or Hf, in the said catalyst, and more preferably in the range of about 50 to 500 moles of aluminum per mole of total transition metals.

The catalyst system of the present invention can operate in polymerizing alpha-olefins in slurry and gas phase processes. Gas phase polymerization can be carried out in stirred bed reactors and in fluidized bed reactors. In the case of slurry polymerization, the liquid polymerization medium can be an alkane or cycloalkane, such as butane, pentane, hexane, or cyclohexane, or an aromatic hydrocarbon, such as toluene or ethylbenzene.

Hydrogen can be very conveniently used during polymerization with the catalyst of the invention to regulate the molecular weight of the polymer product. When the catalyst composition of the invention is used to polymerize olefins, and in particular ethylene, the preferred hydrogen to olefin molar ratio in a gas phase reactor is between 0.01 and 0.9 of $H_2$ per mole of $C_2$.

For ethylene polymerization, ethylene partial pressure in the range of about 70 to 350 psi and the polymerization temperature in the range of about 60° C. to 110° C. are preferred. When the polymerization process is operated under such conditions, polymers with a multimodal and preferably a bimodal molecular weight distribution are obtained, as evidenced by gel permeation chromatography. Generally, bimodal molecular distribution polymers have excellent mechanical properties and are easy to process.

Polymers produced using the catalyst system of the present invention have a molecular weight in the range of about 500 to 2,000,000, and preferably about 1000 to 500,000. The polydispersites (molecular weight distribution) expressed as Mw/Mn are typically from about 5 to 100. The catalyst systems of the present invention also have high activity of at least about 20 to 100 kilograms of polymer per mmol metal hour.

The melt flow ratios (MFR) values of medium density polyethylene produced with the catalyst systems of the present invention ranges from about 40 to about 200, and preferably from about 70 to about 100, with a melt flow index ($I_{21}$) of about 5 to about 100, and preferably about 7 to 30. These flow index and MFR values indicate that the resins produced with the catalyst systems of the invention are broad molecular weight distribution polymers. It also indicates that these resins are suitable for high density polyethylene film and blow molding grades resins. The gel permeation chromatography of the polymers produced by the catalyst systems of this invention shows a broad and bimodal molecular weight distribution. The catalyst systems according to the invention also produce polymers with high thermal stability having the oxygen induction time ranging from about 3.1 minutes to about 5.5 minutes at 180° C., compared to 0.8 minutes to about 2.1 minutes at 180° C. for the bimodal MWD PE polymers produced by the prior art bimetallic catalyst systems supported on silica. The catalyst systems prepared according to this invention using polyvinylchloride polymeric supports produces polymer with low ash content of about 50 to about 250 ppm and high clarity polymers compared to those produced by the prior art bimetallic catalyst systems supported on silica which produce polymers with ash level of about 350 ppm to about 650 ppm and polymers with lower clarity.

Linear polyethylene polymers produced using the catalyst systems of this invention are homopolymers of ethylene or copolymers of ethylene with one or more $C_3$-$C_{10}$ alpha-olefins. Particular examples of these copolymers are ethylene/1-butene copolymers, ethylene/1-hexene copolymers, ethylene/1-octene copolymers, and ethylene 4-methyl-1-pentene copolymers. Ethylene/1-hexene and ethylene/1-butene are the most preferred copolymers made with the catalyst systems of this invention.

In addition to polyethylene homopolymer, ethylene can be readily copolymerized with alpha-olefins according to the present invention to produce copolymers having multimodal molecular weight distributions. Preferred examples of such copolymers include ethylene/propylene, ethylene/1-hexene. Using the catalyst system of the invention, and preferably a $Cp_2ZrCl_2$—$CpTiCl_3$ catalyst system, ethylene can also be copolymerized with styrene, with more than 0.5 mole % styrene incorporation.

EXAMPLES

The following examples are intended to be illustrative of this invention and they are not to be taken as limiting the scope of this invention. Numerous changes and modifications can be made to thereto without departing from the spirit of the invention.

Example 1

Synthesis of Catalyst (A)

To a three-necked round bottom flask, equipped with a condenser and magnetic stirrer, 10 g of polyvinylchloride spheres of 30 μm average particle size was added. The flask containing the polyvinylchloride spheres was heated to 70° C. using an oil bath and then evacuated at 30 mm Hg pressure for 30 minutes. The flask and its contents were then purged with dried nitrogen and the polyvinylchloride spheres were then slurried using 30 cm$^3$ of iso-pentane. Then 3 cm$^3$ of butyl-magnesium chloride (2M) was added to the slurry at 45° C. and the resultant mixture was stirred for 30 minutes at room temperature. Then 0.025 cm$^3$ of 100 wt % pure ethanol was syringed into the flash via rubber suba-seal and the contents stirred for about 5 minutes at room temperature. The temperature of the oil bath containing the flask was raised to 55° C., and it was subjected to nitrogen purging under continuous stirring for about 15 minutes to evaporate the iso-pentane solvent from the mixture. Thereafter, vacuum was applied to the mixture for another 10 minutes at the same temperature (55° C.) under stirring to ensure that the catalyst mixture was 100% dry and free from any solvents. Then, a zirconocene dichloride solution (0.11 g of $Cp_2ZrCl_2$ in 30 cm$^3$ toluene) was added and mixed for 65 minutes at 65° C. This was followed by the addition of cyclopentadienyl titanium trichloride solution (0.075 g of $CpTiCl_3$ in 15 cm$^3$ toluene). The catalyst mixture was then mixed at the same temperature (65° C.) for 30 minutes. The oil bath temperature was then raised to 75° C., and the mixture nitrogen purged under continuous stirring for about 25 minutes to evaporate the toluene from the mixture. The resulting solid was washed once by stirring the catalyst mixture with a 50 cm$^3$ aliquot of n-hexane, and the solvent removed by nitrogen purge at 65° C. Finally, the solid catalyst was dried using a nitrogen purge and vacuum for 20 minutes to yield a free-flowing yellowish brown colored solid product. The solid catalyst component was analyzed by atomic adsorption spectroscopy and was found to contain 0.31% by weight of titanium atoms, 0.055% by weight of zirconium atoms and 0.97% by weight of magnesium atoms.

Example 2

Ethylene Homopolymerization

Figure 1:
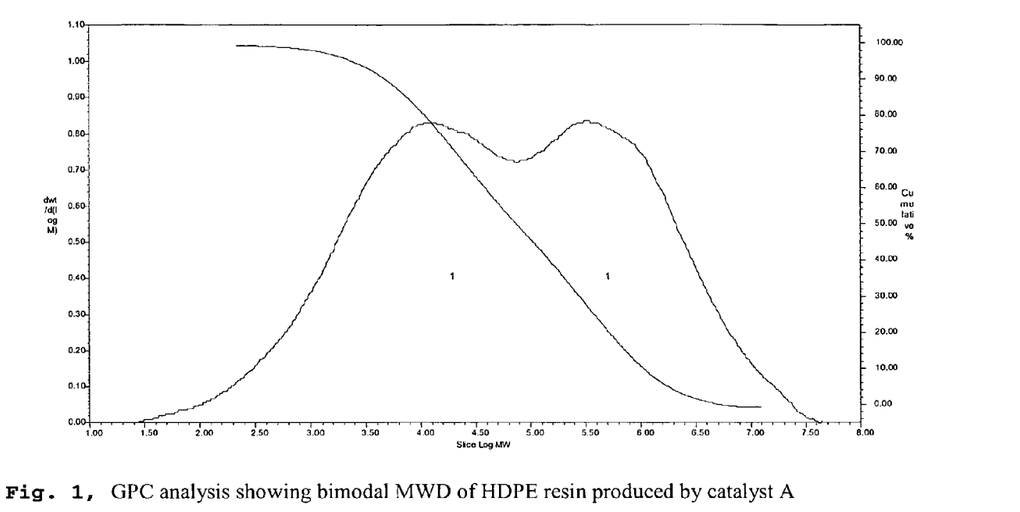
FIG. 1 is a gel permeation chromatography (GPC) analysis showing the bimodal MWD of HDPE resin produced using Catalyst A ($Cp_2ZrCl_2$—$Cp_2TiCl_2$) according to Example 2.

An autoclave with a volume of 2 liters was purged with nitrogen at 130° C. for 30 minutes. After cooling the autoclave to 80° C., one liter of n-hexane was introduced into the reactor. The reactor was then pressurized to 0.4 bar with hydrogen and then to 15 bar with ethylene. Thereafter, 4 cm$^3$ of M-MAO type 3A (7% wt Al) from Akzo-Nobel was injected into the reactor by the means of a catalyst injection pump. Next 0.08 g of the solid Catalyst A, described in Example 1, was injected into the reactor after being slurried in 20 cm$^3$ of n-hexane. The reactor temperature was raised to 95° C. Ethylene polymerization was carried out for 60 minutes, with ethylene supplied on demand to maintain the total reactor pressure at 15 bar. In the reaction, 335 liters of ethylene were consumed and 432.5 grams of polyethylene was recovered giving a catalyst productivity of 5,406 g PE/g cat hr at 200 psig. The polymer had a bulk density of 0.301 g/cm$^3$ and a fines level measured at 2.1%. The polyethylene produced was examined by GPC and was found to have a weight average molecular weight of 341,211, a number average molecular weight of 10,822 and a broad molecular weight distribution of 31.5. The MWD curve of the polymer evidenced a polymer with a bimodal MWD, as shown in FIG. 1.

Example 3

Synthesis of Catalyst (B)

To a three-necked round bottom flask, equipped with a condenser and magnetic stirrer, 10 g of polyvinylchloride spheres of 30 μm average particle size was added The flask containing the polyvinylchloride spheres was heated to 70° C. using an oil bath and then evacuated at 30 mm Hg pressure for 30 minutes. The flask and its contents were then purged with dried nitrogen and the polyvinylchloride sphere were then slurried using 30 cm$^3$ of iso-pentane. Then 3 cm$^3$ of butyl-magnesium chloride (2M) was added to the slurry at 45° C. and the resultant mixture was stirred for 30 minutes at room temperature. Then 0.025 cm$^3$ of 100 wt % pure ethanol was syringed into the flash via rubber suba-seal and the contents stirred for about 5 minutes at room temperature. The temperature of the oil bath containing the flask was then raised to 55° C., and it was subjected to nitrogen purging under continuous stirring for about 15 minutes to evaporate the iso-pentane from the mixture. Thereafter, vacuum was applied to the mixture for another 10 minutes at the same temperature (65° C.) under stirring to ensure that the catalyst mixture is 100% dry and free from any solvents. Then, n-butyl zirconocene dichloride solution (0.075 g of nBu—$Cp_2ZrCl_2$ in 20 cm$^3$ toluene) was added and mixed for 50 minutes at 65° C. This was followed by the addition of biscyclopentadienyl titanium dichloride solution (0.09 g of $Cp_2TiCl_2$ in 20 cm$^3$ toluene). The catalyst mixture was then mixed at the same temperature (65° C.) for 30 minutes. The oil bath temperature was then raised to 75° C., and the mixture nitrogen purged under continuous stirring for about 25 minutes to evaporate the toluene from the mixture. The resulting solid was washed once by stirring the catalyst mixture with a 50 cm$^3$ aliquot of n-hexane and the solvent removed by nitrogen purge at 65° C. Finally, the solid catalyst was dried using a nitrogen purge and vacuum for 20 minutes to yield a free-flowing yellowish brown colored solid product. The solid catalyst component was analyzed by atomic adsorption spectroscopy and was found to contain 0.43% by weight of titanium atoms, 0.051% by weight of zirconium atoms and 0.99% by weight of magnesium atoms.

Example 4

Ethylene Homopolymerization

Figure 2:
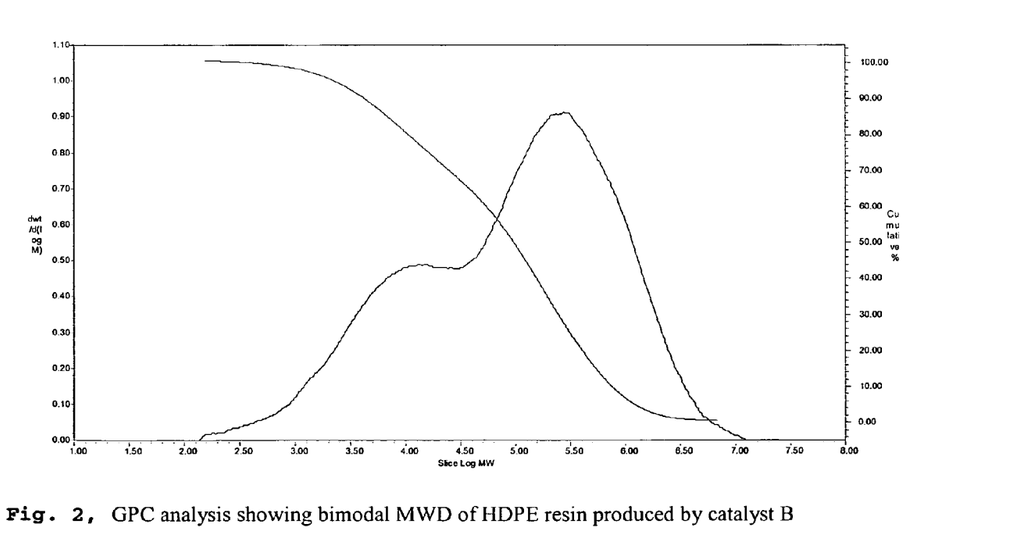
FIG. 2 is a GPC analysis showing the bimodal MWD of HDPE resin produced using Catalyst B (nBu—$Cp_2ZrCl_2$—$Cp_2TiCl_2$) according to Example 4.

An autoclave with a volume of 2 liters was purged with nitrogen at 130° C. for 30 minutes. After cooling the autoclave to 80° C., one liter of n-hexane was introduced into the reactor. The reactor was then pressurized to 0.9 bar with hydrogen and then to 15 bar with ethylene. Thereafter 4 cm$^3$ of M-MAO type 3A (7% wt Al) from Akzo-Nobel was injected into the reactor by the means of a catalyst injection pump. This was followed by the injection of 0.085 g of the solid Catalyst B, described in Example 3, slurried in 20 cm³ of n-hexane. The reactor temperature was raised to 95° C. Ethylene polymerization was carried out for 45 minutes, with ethylene supplied on demand to maintain the total reactor pressure at 15 bar. In the reaction, 273 liters of ethylene were consumed and 340 grams of polyethylene recovered giving a catalyst productivity of 4,000 g PE/g cat hr at 200 psig. The polymer had a bulk density of 0.311 g/cm³ and a fines level measured at 2.3%. The polyethylene was examined by GPC and was found to have a weight average molecular weight of 244,600, a number average molecular weight of 8,181 and a broad molecular weight distribution of 29.9. The MWD curve of the polymer evidenced a polymer with a bimodal MWD, as shown in FIG. 2.

Example 5

Synthesis of Catalyst (C)

To a three-necked round bottom flask, equipped with a condenser and magnetic stirrer, 10 g of polyvinylchloride spheres of 30 μm average particle size was added. The flask containing the polyvinylchloride was heated to 70° C. using an oil bath and then evacuated at 30 mm Hg pressure for 30 minutes. The flask and its contents were then purged with dried nitrogen and the polyvinylchloride spheres were then slurried using 30 cm³ of iso-pentane. Then 3 cm³ of butylmagnesium chloride (2M) was added to the slurry at 45° C. and the resultant mixture was stirred for 30 minutes at room temperature. Then 0.025 cm³ of 100 wt % pure ethanol was syringed into the mixture via the rubber suba-seal and stirred for about 5 minutes at room temperature. After which, the oil bath temperature was raised to 55° C., and the mixture was nitrogen purged under continuous stirring for about 15 minutes to evaporate the iso-pentane from the mixture. Thereafter, vacuum was applied for another 10 minutes at the same temperature (55° C.) under stirring to ensure that the catalyst mixture was 100% dry and free from any solvents. Then, zirconocene dichloride solution was added (0.1 g of $Cp_2ZrCl_2$ in 30 cm³ toluene) and mixed for 50 minutes at 65° C. This was followed by the addition of biscyclopentadienyl vanadium dichloride solution (0.1 g of $Cp_2VCl_2$ in 30 cm³ toluene). This catalyst mixture was then mixed at the same temperature (65° C.) for another 60 minutes. The oil bath temperature was then raised to 75° C., and the mixture nitrogen purged under continuous stirring for about 25 minutes to evaporate the toluene from the mixture.

The resulting solid was washed once by stirring the catalyst mixture with a 50 cm³ aliquot of n-hexane, and then the solvent was removed by nitrogen purge at 65° C. Finally, the solid catalyst was dried using a nitrogen purge and vacuum for 20 minutes to yield a free-flowing yellowish brown colored solid product. The solid catalyst component was analyzed by atomic adsorption spectroscopy and was found to contain 0.15% by weight of vanadium atoms, 0.085% by weight of zirconium atoms, and 1.1% by weight of magnesium atoms Example 6

Ethylene Homopolymerization

Figure 3:
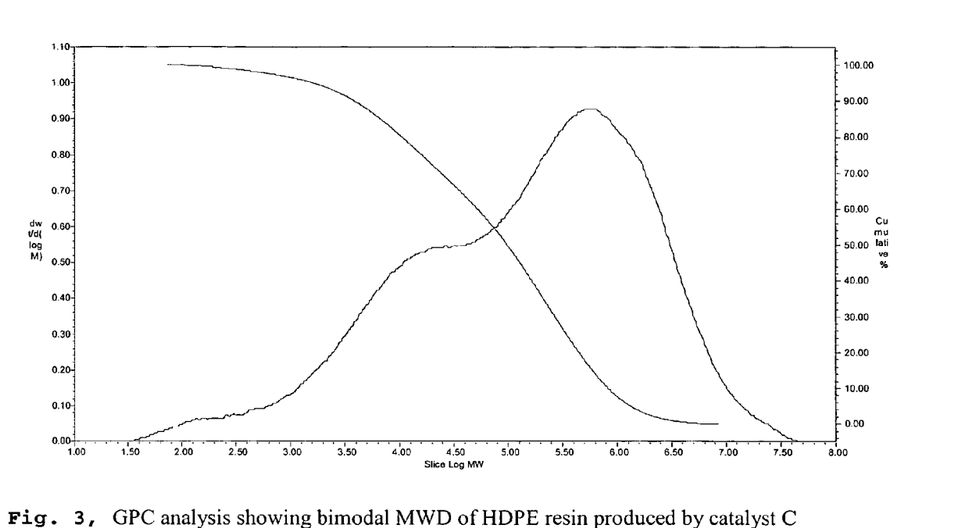
FIG. 3 is a GPC analysis showing the bimodal MWD of HDPE resin produced using Catalyst C ($Cp_2ZrCl_2$—$Cp_2VCl_2$) according to Example 6.

An autoclave with a volume of 2 liters was purged with nitrogen at 130° C. for 30 minutes. After cooling the autoclave to 80° C., one liter of n-hexane was introduced to the reactor. The reactor was then pressurized with 0.8 bar of hydrogen and then to 15 bar with ethylene. Then 3 cm³ of M-MAO type 3A (7% wt Al) from Akzo-Nobel was injected into the reactor by the means of a catalyst injection pump. This was followed by injection of 0.09 g of the solid Catalyst C, described in Example 5, slurried in 20 cm³ of n-hexane. The reactor temperature was raised to 97° C. Ethylene polymerization was carried out for 60 minutes, with ethylene supplied on demand to maintain the total reactor pressure at 15 bar. In the reaction, 299 liters of ethylene were consumed and 397.4 grams of polyethylene recovered giving a catalyst productivity of 3,974 g PE/g cat h at 200 psig. The polymer had a bulk density of 0.313 g/cm³ and the fines level was measured at 1.1%. The polyethylene was examined by GPC and was found to have a weight average molecular weight of 342,272, a number average molecular weight of 10,982 and a broad molecular weight distribution of 31.1. The MWD curve of the polymer evidenced a polymer with a bimodal MWD, as shown in FIG. 3.

Example 7

Synthesis of Catalyst (D)

To a three-necked round bottom flask, equipped with a condenser and magnetic stirrer, 10 g of polyvinylchloride spheres of 30 μm average particle size was added. The flask containing the polyvinylchloride spheres was heated up to 70° C. using an oil bath and then evacuated at 30 mm Hg pressure for 30 minutes. The flask and its contents were then purged with dried nitrogen and the polyvinylchloride spheres were then slurried using 30 cm³ of iso-pentane. Then 3 cm³ of butylmagnesium chloride (2M) was added to the slurry at 45° C. and the resultant mixture was stirred for 30 minutes at room temperature. Then 0.025 cm³ of 100 wt % pure ethanol was syringed into the mixture via the rubber suba-seal and was stirred for about 5 minutes at room temperature. After which, the oil bath temperature was raised to 55° C., and the mixture was nitrogen purged under continuous stirring for about 15 minutes to evaporate the iso-pentane solvent from the mixture. Finally, vacuum was applied for another 10 minutes at the same temperature (55° C.) under stirring to ensure that the catalyst mixture was 100% dry and free from any solvents. Then, bis-n-butyl cyclopentadienyl zirconium dichloride solution was added (0.1 g of nBu—$Cp_2ZrCl_2$ in 30 cm³ toluene) and mixed for 50 minutes at 65° C. This was followed by the addition of cyclopentadienyl hafnium trichloride solution (0.1 g of $CpHfCl_3$ in 30 cm³ toluene). The catalyst mixture was then mixed at the same temperature (65° C.) for another 60 minutes. After which, the oil bath temperature was raised to 75° C., and the mixture nitrogen purged under continuous stirring for about 25 minutes to evaporate the toluene from the mixture. The resulting solid was washed once by stirring the catalyst mixture with a 50 cm³ aliquot of n-hexane, and then the solvent was removed by nitrogen purge at 65° C. Finally, the solid catalyst was dried using a nitrogen purge and vacuum for 20 minutes to yield a free-flowing greyish brown colored solid product. The solid catalyst component was analyzed by atomic adsorption spectroscopy and was found to contain 0.097% by weight of hafnium atoms, 0.059% by weight of zirconium atoms, and 1.2% by weight of magnesium atoms.

Example 8

Ethylene Homopolymerization

Figure 4:
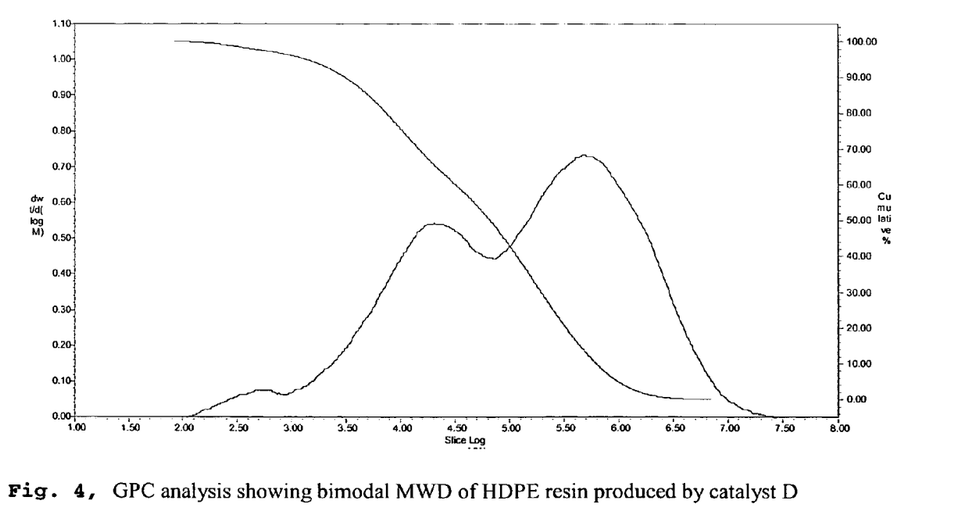
FIG. 4 is a GPC analysis showing the bimodal MWD of HDPE resin produced using Catalyst D (nBu—$Cp_2ZrCl_2$—$Cp_2HfCl_2$) according to Example 8.
Figure 5:
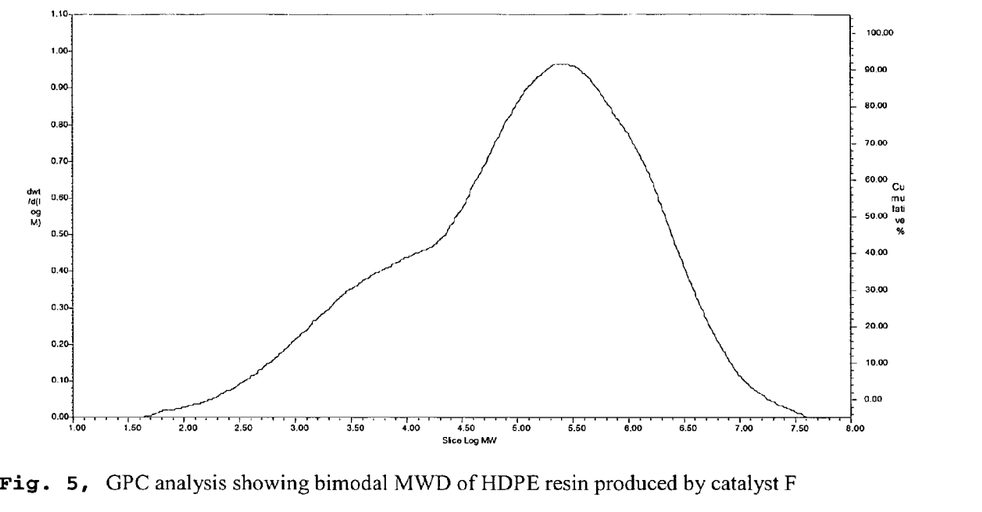
FIG. 5 is a GPC analysis showing the bimodal MWD of HDPE resin produced using Catalyst F (nBu—$Cp_2ZrCl_2$—$Cp_2TiCl_2$—MMAO) according to Example 12.
Figure 6:
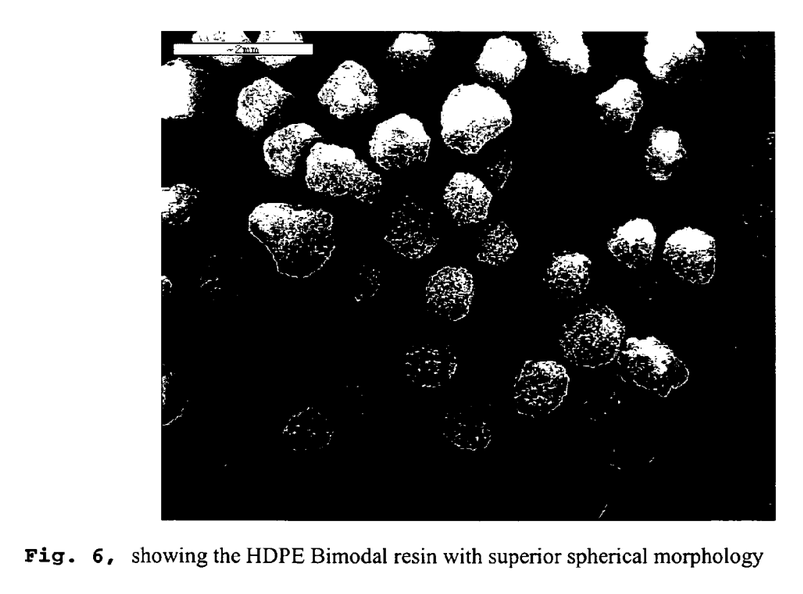
FIG. 6 is a scanning electron microscope (SEM) micrograph showing a perspective view of the spherical HDPE bimodal polymer particles with low level of fines produced with a bimetallic catalyst according to the present invention.

An autoclave with a volume of 2 liters was purged with nitrogen at 130° C. for 30 minutes. After cooling the autoclave to 80° C., one liter of n-hexane was introduced to the reactor. The reactor was then pressurized with 0.6 bar hydrogen and then up to 15 bar with ethylene. Then 4 cm$^3$ of M-MAO type 3A (7% wt Al) from Akzo-Nobel was injected into the reactor by the means of a catalyst injection pump. This was followed by injection of 0.09 g of the solid catalyst D, described in Example 7 slurried in 20 cm$^3$ of n-hexane. The reactor temperature was raised to 98° C. Ethylene polymerization was carried out for 60 minutes, with ethylene supplied on demand to maintain the total reactor pressure at 15 bar. In the reaction, 313 liters of ethylene were consumed and 427.6 grams of polyethylene recovered giving a catalyst productivity of 4,276 g PE/g cat h at 200 psig. The polymer had a bulk density of 0.312 g/cm$^3$ and the fines level was measured at 2.3%. The polyethylene was examined by GPC and was found to have a weight average molecular weight of 195,833, a number average molecular weight of 7,924 and a broad molecular weight distribution of 24.7. The MWD curve of the polymer evidenced a polymer with a bimodal MWD, as shown in FIG. 4.

Example 9

Synthesis of Catalyst (E)

To a three-necked round bottom flask, equipped with a condenser and magnetic stirrer, 10 g of polyvinylchloride spheres of 30 μm average particle size was added. The flask containing the polyvinylchloride spheres was heated up to 70° C. using an oil bath and then evacuated at 30 mm Hg pressure for 30 minutes. The flask and its contents were then purged with dried nitrogen and the polyvinylchloride spheres then slurried using 30 cm$^3$ of iso-pentane. Then 3 cm$^3$ of butylmagnesium chloride (2M) was added to the slurry at 45° C. and the resultant mixture was stirred for 30 minutes at room temperature. Then 0.025 cm$^3$ of 100 wt % pure ethanol was syringed into the mixture via the rubber suba-seal and was stirred for about 5 minutes at room temperature. After which, the oil bath temperature was raised to 55° C., and the mixture was nitrogen purged under continuous stirring for about 15 minutes to evaporate the iso-pentane from the mixture. Thereafter, vacuum was applied for another 10 minutes at the same temperature (55° C.) under stirring to ensure that the catalyst mixture was 100% dry and free from any solvents. Then, rac-dimethyl silyl bis indenyl zirconocene dichloride solution was added (0.075 g of (CH$_3$)$_2$Si—Ind$_2$ZrCl$_2$ in 30 cm$^3$ toluene) and mixed for 50 minutes at 65° C. This was followed by the addition of cyclopentadienyl titanium trichloride solution (0.05 g of CpTiCl$_3$ in 30 cm$^3$ toluene). The catalyst mixture was then mixed at the same temperature (65° C.) for 30 minutes. The oil bath temperature was then raised to 75° C., and the mixture nitrogen purged under continuous stirring for about 25 minutes to evaporate the toluene from the mixture. The resulting solid was washed once by stirring the catalyst mixture with a 50 cm$^3$ aliquot of n-hexane, and then the solvent was removed by nitrogen purge at 65° C. Finally, the solid catalyst was dried using a nitrogen purge and vacuum for 20 minutes to yield a free-flowing yellowish brown colored solid product. The solid catalyst component was analyzed by atomic adsorption spectroscopy and was found to contain 0.27% by weight of titanium atoms, 0.065% by weight of zirconium atoms and 0.99% by weight of magnesium atoms.

Example 10

Ethylene Homopolymerization

An autoclave with a volume of 2 liters was purged with nitrogen at 130° C. for 30 minutes. After cooling the autoclave to 80° C., one liter of n-hexane was introduced to the reactor. The reactor was then pressurized with 0.5 bar of hydrogen and then up to 15 bar with ethylene. Then 4 cm$^3$ of M-MAO type 3A (7% wt Al) from Akzo-Nobel was injected into the reactor by the means of a catalyst injection pump. This was followed by injection of 0.075 g of the solid Catalyst E, described in Example 9, slurried in 20 cm$^3$ of n-hexane. The reactor temperature was raised to 95° C. Ethylene polymerization was carried out for 50 minutes, with ethylene supplied on demand to maintain the total reactor pressure at 15 bar. In the reaction, 355 liters of ethylene were consumed and 499 grams of polyethylene recovered giving a catalyst productivity of 6,653 g PE/g cat h at 200 psig. The polymer had a bulk density of 0.323 g/cm$^3$ and the fines level was measured at 1.3%. The polyethylene was examined by GPC and was found to have a weight average molecular weight of 189,756 a number average molecular weight of 9,123 and a broad molecular weight distribution of 20.7. The MWD curve of the polymer evidenced a polymer with a bimodal MWD.

Example 11

Synthesis of Catalyst (F)

Pre-Activated with MMAO

To a three-necked round bottom flask, equipped with a condenser and magnetic stirrer, 10 g of polyvinylchloride spheres of 30 μm average particle size was added. The flask containing the polyvinylchloride spheres was heated up to 70° C. using an oil bath and then evacuated at 30 mm Hg pressure for 30 minutes. The flask and its contents were then purged with dried nitrogen and the polyvinylchloride spheres were then slurried using 30 cm$^3$ of iso-pentane. Then 3 cm$^3$ of butylmagnesium chloride (2M) was added to the slurry at 45° C. and the resultant mixture was stirred for 30 minutes at room temperature. Then 0.025 cm$^3$ of 100 wt % pure ethanol was syringed into the mixture via the rubber suba-seal and was stirred for about 5 minutes at room temperature. After which, the oil bath temperature was raised to 55° C., and the mixture was nitrogen purged under continuous stirring for about 15 minutes to evaporate the iso-pentane from the mixture. Finally, vacuum was applied for another 10 minutes at the same temperature (55° C.) under stirring to ensure that the catalyst mixture was 100% dry and free from any solvents. Then, nBu-zirconocene dichloride solution was added (0.07 g of nBu—Cp$_2$ZrCl$_2$ in 30 cm$^3$ toluene) and mixed for 40 minutes at 65° C. This was followed by the addition of titanocene dichloride solution (0.05 g of Cp$_2$TiCl$_2$ in 30 cm$^3$ toluene). The catalyst mixture was then mixed at the same temperature (65° C.) for 30 minutes. After which, toluene was allowed to evaporate under nitrogen purge at 75° C. Then the catalyst was then washed once with iso-pentane to remove toluene. The catalyst mixture was slurried again with a small amount of isopentane and 3.5 cm$^3$ of M-MAO type 3A (7% wt Al) from Akzo-Nobel to pre-activate the catalyst. The mixture was stirred for 60 minutes at 35° C., after which the isopentane was evaporated by nitrogen purge at 65° C. Finally, the solid catalyst was dried using a nitrogen purge and vacuum for 20 minutes to yield a free-flowing yellowish brown colored solid product. The solid catalyst component was analyzed by atomic adsorption spectroscopy and was found to contain 0.31% by weight of titanium atoms, 0.065% by weight of zirconium atoms, 1.1% by weight of magnesium atoms and 1.2% by weight of aluminum atoms.

Example 12

Ethylene Homopolymerization

An autoclave with a volume of 2 liters was purged with nitrogen at 130° C. for 30 minutes. After cooling the autoclave to 80° C., one liter of n-hexane was introduced to the reactor. Then the reactor was then pressurized with 0.5 bar hydrogen and then up to 15 bar with ethylene. Then 2 cm$^3$ of 2M trimethylaluminum (TMA), was injected into the reactor by the means of a catalyst injection pump. This was followed by injection of 0.075 g of the solid Catalyst E described in Example 9, slurried in 20 cm$^3$ of n-hexane. The reactor temperature was raised to 95° C. Ethylene polymerization was carried out for 60 minutes, with ethylene supplied on demand to maintain the total reactor pressure at 15 bar. In the reaction, 453 liters of ethylene were consumed in 30 minutes and 585.5 grams of polyethylene recovered giving a catalyst productivity of about 7,806 g PE/g cat h at 200 psig. The polymer had a bulk density of 0.353 g/cm$^3$ and the fines level was measured at 2.1%. The polyethylene was examined by GPC and was found to have a weight average molecular weight of 333,489, a number average molecular weight of 11,569 and a broad molecular weight distribution of 28.8.

What is claimed is:

1. A catalyst composition for the polymerization of olefins comprising:
    A) a solid catalyst precursor consisting essentially of a first metallocene compound represented by the formula $(Cp)_zZrR_wX_y$, wherein Cp represents an unsubstituted or substituted cyclopentadienyl ring, R represents a hydrocarbyl group, X represents a halogen atom, and $1 \leq z \leq 3$, $0 \leq w \leq 3$, and $0 \leq y \leq 3$; a second metallocene compound represented by the formula $(Cp')_xMR'_wX'_y$, wherein Cp represents an unsubstituted or substituted cyclopentadienyl ring, M represents titanium, vanadium or hafnium, R' represents a hydrocarboxyl group, X' represents a halogen atom, and $1 \leq z \leq 3$, $0 \leq w \leq 3$, and $0 \leq y \leq 3$; optionally a metallocene activator comprising an aluminum compound; a magnesium compound; an alcohol compound represented by the formula ROH, wherein R is an alkyl, aryl, or cycloalkyl group having 1 to 20 carbon atoms; and a polymeric support; and
    B) a co-catalyst comprising an aluminum compound.

2. The catalyst composition of claim 1, wherein the polymeric support comprises polymer particles having a spherical shape with a mean particle diameter of about 5 μm to about 1000 μm, a pore volume of at least 0.02 cm$^3$/g, a pore radius of 10 to 1000 Angstroms and a surface area of from about 0.5 to 50 m$^2$/gm.

3. The catalyst composition of claim 2, wherein the polymer particles comprise polyolefins, polyvinylchloride, polyvinylalcohol or polycarbonate.

4. The catalyst composition of claim 3, wherein the polymer particles comprise polyvinylchloride having a molecular weight in the range of 5,000 to 200,000 g/mole, a diameter from about 15 μm to 100 μm, a surface area from about 1.0 m$^2$/g to about 10 m$^2$/g, and a pore volume of at least 0.1 cm$^3$/g.

5. The catalyst composition in claim 4, wherein the magnesium compound is represented by general formula R$^2$MgX or R$^3$R$^4$Mg, wherein R$^2$, R$^3$ and R$^4$ are the same or different hydrocarbon groups having 1 to 20 carbon atom and X is a halogen atom.

6. The catalyst composition of claim 4, wherein the magnesium compound comprises diethylmagnesium, dibutylmagnesium, butylethylmagnesium, dihexylmagnesium, butyloctyl magnesium, ethylmagnesium chloride, butylmagnesium chloride or hexylmagnesium chloride.

7. The catalyst composition in claim 6, wherein the second metallocene compound comprises biscyclopentadienyl titanium dichloride, cyclopentadienyl titanium trichloride, biscyclopentadienyl vanadium dichloride, cyclopentadienyl vanadium trichloride, biscyclopentadienyl hafnium dichloride or cyclopentadienyl hafnium trichloride, and wherein the first metallocene compound comprises bis(cyclopentadienyl) zirconium dichloride, bis(methylcyclopentadienyl)zirconium dichloride and bis(n-butylcyclopentadienyl)zirconium dichloride or bis(indenyl)zirconium dichloride with ethylene or dialkyl silicon bridge.

8. The catalyst composition of claim 1, wherein the M:Zr molar ratio is 1:1 to 20:1.

9. The catalyst composition of claim 5, wherein the aluminum compound for the optional metallocene activator and/or the co-catalyst comprise:
    A) an aluminum compound represented by the general formula R$^5_n$AlX$_{3-n}$, wherein R$^5$ is a hydrocarbon group having 1 to 10 carbon atoms, X is a halogen atom or an alkoxy group, and n=1, 2 or 3, and/or
    B) an aluminoxane represented by the general formula for a linear aluminoxane, where q represents a number satisfying $0 \leq q \leq 50$, and/or for a cyclic aluminoxane, wherein s represents a number satisfying $3 \leq s \leq 50$, and R$^7$, R$^8$, R$^9$ and R$^{10}$ are either the same or different linear, branched or cyclic alkyl groups of 1 to 12 carbons.

10. The catalyst composition of claim 9, wherein the aluminum compounds for the optional metallocene activator and/or the co-catalyst comprise both a trialkylaluminum and an alkyl aluminoxane or modified aluminoxane.

11. The catalyst composition of claim 9, wherein the ratio of moles of aluminum in the co-catalyst to the moles of the total transition metals Zr and Ti, V or Hf in the catalyst precursor is about 50 to 1 to about 500 to 1.

12. The catalyst composition of claim 5, wherein the alcohol compound is selected from the group consisting of methanol, ethanol, propanol and iso-propanol.

13. The process of polymerizing olefins, comprising contacting olefins with the catalyst composition of claim 1 under olefin polymerization conditions.

14. The process of claim 13, wherein the polymerization comprises the homopolymerization or copolymerization of alpha-olefins.

15. The process of claim 14, wherein the alpha-olefin is ethylene.

16. The process of polymerizing olefins, comprising contacting olefins with the catalyst composition of claim 5 under olefin polymerization conditions.

17. The process of polymerizing olefins, comprising contacting olefins with the catalyst composition of claim 7 under olefin polymerization conditions.

18. The process of polymerizing olefins, comprising contacting olefins with the catalyst composition of claim 9 under olefin polymerization conditions.

19. The process of polymerizing olefins, comprising contacting olefins with the catalyst composition of claim 10 under olefin polymerization conditions.

20. The process of polymerizing olefins, comprising contacting olefins with the catalyst composition of claim 11 under olefin polymerization conditions.

* * * * *